United States Patent Office 3,407,241
Patented Oct. 22, 1968

3,407,241
ISOMERIZATION OF 3-CARENE TO 4-CARENE AND FURTHER CONVERSION OF 4-CARENE
Albert B. Booth, Jekyll Island, Ga., assignor to Hercules Incorporated, Wilmington, Del., a corporation of Delaware
No Drawing. Filed July 7, 1966, Ser. No. 563,370
36 Claims. (Cl. 260—675.5)

ABSTRACT OF THE DISCLOSURE 3-carene is converted to 4-carene by means of a catalyst system comprised of an alkali metal base composition or by a hydrogenation catalyst. The isomerizations give 60:40 near-equilibrium mixtures. A little 2-carene is sometimes present. The 4-carene is thermally converted to d-trans-isolimonene which is distillable from the unconverted 3-carene. The isolimonene is half-hydrogenated to d-trans-2-methene, or isomerized to d-2,4(8)-p-methadiene.

---

This invention relates to the conversion of 3-carene to industrial chemicals, and particularly to the conversion of 3-carene to 4-carene and the further conversion of 4-carene to useful para-monocyclic terpene derivatives.

More particularly, this invention relates to the conversion of dextro-3-carene to levo-menthol.

The parenes occur naturally in various essential oils and one of them, dextro-3-carene (d-3-carene), is a major constituent of turpentines. Commercially important pine species which yield turpentine rich in d-3-carene are found in all continents of the world where pine trees occur naturally, some typical species being *P. ponderosa* in North America, *P. sylvestris* in Europe, and *P. longifolia* in Asia.

For purposes of this application, the shorter and more modern term, 3-carene, is used in place of the older term, delta-3-carene, and 4-carene is used in place of delta-4-carene.

The carenes can be represented by the structural formula

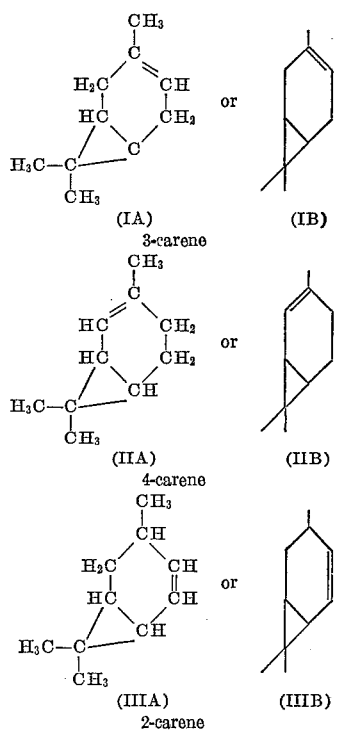

(IA)    (IB)
3-carene (IIA)    (IIB)
4-carene (IIIA)    (IIIB)
2-carene

Although most turpentines are equivalent for such uses as solvents for grease, as paint thinners, as paint brush cleaners and the like; today major amounts of turpentines are used as raw materials for the production of other useful chemicals. In such uses, the turpentines are usually rectified by distillation to obtain concentrates of individual terpenes such as α-pinene and β-pinene. β-Pinene is the most widely used material for the manufacture of terpene resins. Also, it is converted thermally to myrcene and then to a number of odor and flavor chemicals. α-Pinene is the usual raw material for conversion to camphene and for hydration to synthetic pine oil and mixed p-methadiene hydrocarbons which are raw material for p-cymene. β-Pinene can be used for these applications also, but, as it is generally much more costly than α-pinene, it is usually used only in those applications where α-pinene cannot serve as well.

A review of important industrial uses of various components of turpentine shows that the carenes, and particularly the widely available d-3-carene, are not suited to replace either of the pinenes in these uses. Thus, 3-carene does not polymerize to hard high melting terpene resins; only oils are obtained. Nor does thermal isomerization yield myrcene or similar acyclics. The usual hydration procedures which are successful with α- and β-pinenes do not give useful amounts of synthetic pine oils from carene. No catalyst and/or conditions have been found which will convert 3-carene to camphene. Vigorous acid treatment converts 3-carene to a mixture of meta- and para-menthadienes and viscous oils. The meta- and para-menthadienes, if dehydrogenated to cymenes, give the mixed meta- and para-cymenes, which are not readily separable and which are not presently useful for the chemical applications of pure p-cymene, namely, the manufacture of p-cresol and its derivatives. Because the carenes in general do not follow the reaction patterns of the pinenes and therefore cannot be utilized in known ways, they continue to find their only important utilization in traditional turpentine uses as solvents for paint and the like.

Although 3-carene is not presently useful in the same ways as the pinenes as an industrial chemical raw material because its chemistry does not parallel that of the pinenes, I have found that by means of new conversions it can be utilized as a chemical raw material leading to valuable products.

It is an objective of this invention to convert 3-carene to chemicals more valuable than hydrocarbon solvents.

Another objective is to convert 3-carene to p-methadienes substantially free of meta-menthadienes.

Another objective is to convert 3-carene to p-cymene substantially free of meta-cymene.

Another objective is to convert optically active 3-carene to optically active p-methadienes.

Another objective is to convert optically active 3-carene to optically active p-methenes.

A further objective of this invention is to convert d-3-carene to levo-menthol.

Another objective is to convert 3-carene to a hard terpene resin.

Other objectives of this invention will be apparent to those skilled in the art.

In accordance with this invention, I have found that (1) in the presence of strong bases or (2) in the presence of hydrogenation catalysts under a pressure of hydrogen, 3-carene is converted partially to its isomer, 4-carene. This partial conversion of 3-carene to 4-carene has the nature of a reversible reaction and can be carried out so as to come to an equilibruim mixture of 3-carene and 4-carene with not more than traces of other components.

The partial conversion of 3-carene to 4-carene would not be unusually useful in itself because like 3-carene, 4-carene has no known use except as a component of turpentine, the turpentine being useful as a paint thinner, and the like. However, I made the additional discovery that heating 4-carene isomerizes it substantially quantitatively to isolimonene, which is also known as 2,8-p-menthadiene.

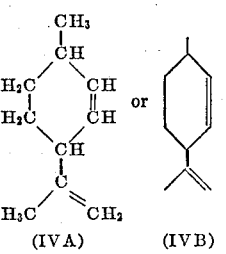

(IVA)     (IVB)

Isolimonene (2,8-p-menthadiene)

Isolimonene is suitable for further conversion to other useful materials as hereinafter disclosed.

Isolimonene also is useful in that it can be polymerized to a hard terpene resin (3-carene yields only oils) in a manner such as that used heretofore to convert other terpenes, such as β-pinene, to hard resins, and so the present invention thus provides a way to convert 3-carene to hard terpene resins. These hard terpene resins have utility as components of printing inks, as components of protective coating compositions, as components of adhesive compositions, and the like.

The isolimonene produced by thermal treatment of d-4-carene (derived from d-3-carene) is the d-trans isomer. This isomer is sterically related to the valuable levo-menthol.

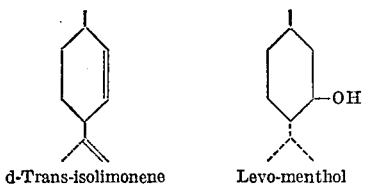

d-Trans-isolimonene     Levo-menthol

It is known (Pigulevsky and Kozhina, J. Gen. Chem. USSR Eng. TR 27, 879–90, reference to which is hereby made) that d-trans-2-methene can be converted to levo-menthol (plus carvo-menthol) by a process of epoxidation and hydrogenation of the epoxide. I have found that d-trans-isolimonene can be hydrogenated with a high degree of selectivity under certain conditions to d-trans-2-menthene. The compound, d-trans-2-menthene can be represented by the formula

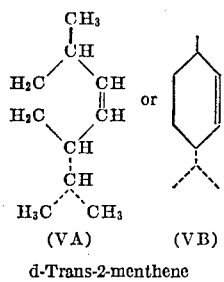

(VA)     (VB)

d-Trans-2-menthene

The present process of converting d-3-carene to d-trans-isolimonene and the selective hydrogenation of d-trans-isolimonene to d-trans-2-menthene provides a means of converting the hitherto nearly valueless d-3-carene to an economically important chemical, levo-menthol, most of which is still obtained from foreign agricultural sources. Noncatalytic methods can also be used for accomplishing the reduction of d-trans-isolimonene to d-trans-2-menthene as will be described more fully hereinafter and also as will be exemplified with working examples of this reduction.

Having provided in the present invention a source of d-trans-isolimonene and its partial reduction product d-trans-2-menthene, other methods of converting the 2,3 double bond to a hydroxyl group will occur to the practiced organic chemist in addition to the procedure of Pigulevsky and Kozhina, which procedure has been referred to above.

I have found still another way to convert d-trans-isolimonene to levo-menthol which comprises isomerizing it to d-2,4(8)-p-menthadiene by means of a strong base and then converting this hydrocarbon, by known means, to levo-methol.

The componud, d-2,4(8)-p-menthadiene, also referred to in the art as d-isoterpinolene, can be represented by the formula

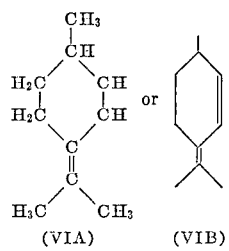

(VIA)     (VIB)

d-2,4(8)-p-menthadiene (d-isoterpinolene)

Prior art methods of making menthol from 2,4(8)-p-menthadiene have been limited to making dl-menthol because the only economically available form of 2,4(8)-p-menthadiene was the dl mixture (mixture of dextro-2,4(8)-p-menthadiene and levo-2,4(8)-p-menthadiene) available from acid treatment of certain terpenes. Patent 2,851,481 describes a process wherein the hydrochloride of dl-2,4(8)-p-menthadiene is hydrolyzed chiefly to dl-3-menthene-8-ol which in turn can be rearranged to dl-pulegol and the last hydrogenated to dl-menthol isomers. Patent 2,866,826 describes a process comprising partial hydrogenation of dl-2,4(8)-p-menthadiene to dl-3-menthene and then converting this to dl-menthol by way of the α-glycol and ketone. Starting from dl-2,4(8)-p-menthadiene these processes can give only dl-menthol, and while this an article of commerce, its volume is a small fraction of that of levo-menthol, and it is generally considered to be acceptable only for uses wherein the full cooling effect of levo-menthol is not required. Reference is hereby made to Patents 2,851,481 and 2,866,826.

Thus, the present invention makes d-2,4(8)-p-menthadiene available for the first time starting from a cheap terpene, d-3-carene, which, from the present state of the art, has only solvent uses, and allows application of known processes, based on treatment of dl-2,4(8)-p-menthadiene, to be applied to the manufacture of levo-menthol. Noncatalytic methods can be used also to accomplish the conversion of d-trans-isolimonene to d-2,4(8)-p-menthadiene, as will be shown.

The first step in the manufacture of the above group of related useful chemicals from d-3-carene is to convert d-3-carene to d-4-carene by means of a catalyst. I have found that suitable catalysts comprise a class consisting of strong bases, applied under conditions where carbanions of a hydrocarbon can be formed, and a class consisting of hydrogenation catalysts in the presence of hydrogen above atmospheric pressure.

The first class of catalysts comprises materials which are essentially simple or complex alkali metal alkyls, including acyclic, cyclic and aromatic alkali metal derivatives, also strong bases such as alkali metal alcoholates and alkali metal amides, which are suitably used in media which allows their basicity to be developed. These alkali metal alcoholates are sufficiently basic to induce the formation of carbanions from hydrocarbons in the presence of dipolar aprotic solvents, such as dimethyl sulfoxide, but not in polar hydroxylic solvents, such as the alcohols. The alkali metal amides similarly are sufficiently basic to cause formation of carbanions when the medium is an amine, or a hydrocarbon, but not when the medium is an alcohol.

It is, of course, convenient to use a hydrocarbon as a medium and very convenient to use d-3-carene itself. In some systems both the d-3-carene and the strong base are present under conditions of appreciable mutual solubility and so the reaction is at least in part a homogeneous one. Under other conditions, the strong base is substantially insoluble in the d-3-carene-containing phase and the reaction is essentially a heterogeneous one taking place on the surface of the base catalyst.

Organic compounds that form compounds or complexes with alkali metals, such as Li, Na, K, Rb, Cs, to provide strong base catalysts for use in this invention include such hydrocarbons as olefins, cyclic olefins, aromatic hydrocarbons including poly-nuclear aromatic and aralkyl hydrocarbons, and acetylenic hydrocarbons; also heterocyclic compounds related to hydrocarbons wherein one or more carbons are replaced with nitrogen or other hetero atoms, such as pyridine, alkyl pyridines, quinolines, pyrrole, and dibenzofuran.

In some cases sodium, or other alkali metal, reacts readily with the above types of organic compounds. In other cases the reaction is so sluggish that it is desirable to use a "promoter" or "initiator" to speed up the reaction between sodium and the organic compound. Such "promoters" or "initiators" may suitably be halogenated organic compounds which react readily with sodium, such, for example, as o-chlorotoluene, and also other metal alkyls including previously formed alkali metal derivatives of a hydrocarbon or related material. In industrial practice it may be desirable to use a little of an old but still active catalyst to help initiate or promote the reaction between sodium and a hydrocarbon, for example, to generate new catalyst. Catalysts such as the alkali metal derivatives of alcohols and amines can ordinarily be prepared by direct reaction of the alkali metal with the alcohol or amine, which usually proceeds readily enough without addition of an initiator.

Depending on the system selected, the strong base catalyst can be preformed and then mixed with the carene to be isomerized, or it can be formed in situ. Metallic sodium promoted with o-chlorotoluene or other halogen compounds as described by Pines and coworkers [see J.A.C.S., 77, 6314 (1955); J.A.C.S., 78, 1178 (1956) and Patent 2,804,489] is a suitable and cheap strong base. Other representative suitable bases are the sodium derivatives of methyl naphthalene in methyl naphthalene; the sodium and/or potassium derivative of gamma-picoline in gamma-picoline; potassium t-butoxide in dimethyl sulfoxide; lithium in ethylene diamine; amyl sodium in hydrocarbons; and the like. In general any base of sufficient strength to form a carbanion under the conditions used is within the scope of the present invention, and the examples, while given to show representative ways of practicing the invention, are not to be construed as limiting, inasmuch as other and equivalent combinations of strong bases, temperature, time and media can also be used.

In general the usual relationships of time, temperature and amount or activity of catalyst apply in the present case. Preferred temperatures range from room temperature to 180° C. The lower temperature is determined by the fact that much below room temperature the reaction tends to be slow unless a high ratio of catalyst to carene is utilized. Above 180° C., the thermal isomerization of 4-carene to isolimonene becomes an increasingly serious side reaction. In the presence of the base the isolimonene is converted to 2,4(8)-p-menthadiene. The formation of small amounts of both meta- and para-cymenes is another side reaction which increases as the temperature is raised. Thus, the preferred range of room temperature to 180° C. is not limiting, and the process can be operated above and below this range with the effects described above. If a catalyst system is selected where the isomerization proceeds rapidly at 180° C. or above, it is quite possible to reduce the time at such temperatures so that the course of the side reactions is largely suppressed and the result of the treatment is largely limited to the isomerization of d-3-carene to d-4-carene.

The isomerization of d-3-carene-d-4-carene is a reversible reaction and ultimately reaches an equilibrium value. The maximum d-4-carene in this equilibrium is about 45% by weight. It is, of course, not necessary to carry the isomerization to the equilibrium point. d-4-carene is lower boiling than d-3-carene and it is possible to stop the isomerization at any point and remove a d-4-carene concentrate by fractional distillation. Because d-4-carene is lower boiling, one mode of operation comprises charging d-3-carene and the catalyst (together with a suitable medium if appropriate for the catalyst) to a catalyst chamber which may be the reboiler of a still, or a chamber which feeds into a still, and removing an overhead product from the still which contains d-4-carene.

For the purpose of converting d-4-carene to d-trans-isolimonene, it is not necessary to separate the carenes from each other. I have found that if a mixture of d-3-carene and d-4-carene is heated to a temperature sufficient to cause isomerization of d-4-carene to d-trans-isolimonene the d-3-carene is substantially unchanged and can be separated readily from the d-trans-isolimonene by fractional distillation. The high degree of thermal stability of d-3-carene is recognized in the literature (Beilstein E–III, vol. 5, p. 363) which shows d-3-carene to be stable at least to 400° C. Suitable heating times are 6 hours at 200° C.; 3.25 hours at 220° C.; 43 minutes at 240° C.; and 11 minutes at 260 C. for substantially complete conversion of d-4-carene to d-trans-isolimonene. Still higher temperatures can be used at correspondingly shorter times, inasmuch as both d-trans-isolimonene and d-3-carene exhibit good thermal stability.

The thermally treated mixture is suitably rectified in a batch fractionating column or a series of fractionating columns comprising a continuous train, separating d-trans-isolimonene as a technically pure light fraction.

Concentrated d-3-carene is the next most volatile material and is likewise recovered as a technically pure material suitable for recycle to the step in which it is isomerized to d-4-carene.

If the base isomerization of d-3-carene to d-4-carene is run under conditions where side reaction products are important, these show up as a still higher boiling material which comprises chiefly meta- and para-cymenes and d-2,4(8)-p-menthadiene. These materials are suitably removed from the system as a higher boiling distillation cut or bottoms product and not recycled, in order to avoid their buildup.

Because of the fairly close boiling points of d-trans-isolimonene and d-3-carene, an efficient column should be used for this separation if d-trans-isolimonene of high purity is desired. In laboratory work it was found that a 1″ diameter batch column packed with 10 feet of 0.16″ protruded packing made a very satisfactory separation.

The manufacturer of d-trans-isolimonene from d-3-carene can be carried out by operating in a continuous process. Such a process comprises a continuous treating step wherein d-3-carene is catalytically isomerized to a mixture containing a desired amount of d-4-carene. This mixture is then separated from the catalyst as by filtration, decantation, distillation or the like and continuously treated thermally at a temperaturer and time sufficient for converting the d-4-carene substantially completely to d-trans-isolimonene. The d-trans-isolimonene is separated as by distillation, as the product and d-3-carene is recycled to the catalytic isomerization step.

A suitable fractionation column (for example, the one described above) will separate by-products into two fractions, namely, (1) mixed meta- and para-cymenes, which are suitable for solvent uses, and (2) di-2,4(8)-p-menthadiene, which is suitable for conversion by known procedures to levo-menthol or to pure para-cymene.

Isomerization of d-3-carene to d-4-carene can be carried out by use of a hydrogenation catalyst in the presence of a limited amount of hydrogen. It is preferred to operate with a pressure of hydrogen above atmospheric pressure. I have discovered that using hydrogen at pressures slightly above atmospheric pressure d-4-carene is formed from d-3-carene using a palladium (Pd) catalyst and that the formation is also catalyzed by a Ni catalyst at temperatures as low as room temperature and by a copper chromite catalyst when conditions are made more vigorous. Suitable conditions for copper chromite are 50–100 p.s.i.g. hydrogen pressure and 150–170° C. This is in keeping with the lower activity of copper chromite in contrast to such catalysts as Pd and Ni which are active at room temperature under a pressure of hydrogen of 50 p.s.i.g. or less. The preferred operating range of this aspect of the invention will be room temperature (about 23° C.) to 180° C. and pressure in excess of atmospheric pressure to about 100 p.s.i.g. A secondary reaction, which comprises essentially hydrogenation of the double bond of d-3-carene, occurs under all conditions and so carene and/or other hydrogenation products are by-products when the hydrogenation catalyst plus hydrogen method is used to isomerize d-3-carene to d-4-carene. Under various conditions the carene can be hydrogenated to menthanes and to trimethyl cycloheptane as well as to carane. In general these materials can be carried along in a process for making d-trans-isolimonene by thermal isomerization of d-4-carene and thence levo-methol, for example. Being saturated they are essentially inert and can be eliminated at a convenient point, if desired. They are useful as solvents and carane can be treated with acid to make dl-3-menthene, which is an intermediate for dl-menthol, as described in Patent 2,846,486.

To minimize these by-product saturated hydrocarbons, it is desirable to operate at the minimum pressure when the more active catalysts are used. In general because it is easy to follow the formation of d-4-carene by infrared spectrophotometry or gas chromatography, the carene-catalyst mixture is suitably contacted with hydrogen at a small pressure above atmospheric, and this pressure is raised in increments until a satisfactory rate of isomerization is achieved as indicated by examination of samples taken for analysis. When copper chromite or a similar less active catalyst is used, the carene and catalyst mixture is suitably held under 50–100 p.s.i.g. hydrogen pressure and the temperature raised in increments until sampling shows that d-4-carene is being formed at a useful rate. Higher pressures can be used, for example, 500 p.s.i.g., with very little change in the rate of by-product formation, because in general these catalysts have a relatively poor ability to cause hydrogenation of carbon to carbon double bonds. However, since in general high pressure equipment is more expensive than low pressure equipment, it will ordinarily be preferred to operate at the lower pressure.

As with the use of a strong base catalyst, the isomerization mixture prepared using a hydrogenation catalyst can be produced in a continuous manner, for example, by pumping in fresh and/or reused d-3-carene, separating a stream of isomerizate continuously from the treating step by, for example, filtration or evaporation, conducting this stream to a thermal isomerization vessel where it is held for a sufficient time at a sufficient temperature to isomerize the d-4-carene to d-trans-isolimonene, and conducting the effluent from the thermal isomerization step to a continuous distillation step where the d-trans-isolimonene is separated, a d-3-carene cut taken for recycle, and by-products removed.

Some consideration should be given to the impurities in the starting d-3-carene when it is used in the above catalytic conversions to d-4-carene. d-3-carene absorbs oxygen from the air rapidly and forms thereby oxidation products. In the mode of the strong base catalyzed isomerization wherein the active base is persent as an insoluble phase and the isomerization is essentially one catalyzed on the surface of the base, it is desirable that the carene be freed of impurities which would coat the active surface. In general these materials (for example, oxidation products) are polar and usually hydroxylic. They can be removed by distilling the carene over sodium, or, alternatively, by adsorption techniques using activated alumina or other adsorbents. In order to prevent reformation of oxidation products the carene so purified should be kept out of contact with the air. The strong base catalysts themselves react with air and moisture and are destroyed thereby, so in general it is desirable to protect the catalyst and the feed carene from these deleterious agents. When proper precautions are taken, very long life can be realized from an activated sodium catalyst. In the batch mode, for example, using a ratio of 1 part by weight of activated sodium per 100 parts by weight of cleaned up carene, the catalyst can be separated from the carene and reused at least a half dozen times, so that in effect at least 600 parts of d-3-carene can be isomerized to d-4-carene with 1 part of sodium.

There is, of course, some attrition of the catalyst, due partly to impurities which combine preferentially with the catalyst, and thus render it useless for the isomerization, and to mechanical losses as fines if a decantation system is used to separate the isomerized carene from the insoluble catalyst. In the high temperature mode at least, however, an active catalyst breeds slowly by contacting sodium metal with the reaction mixture. The nature of the active catalyst formation is not clear and it may be promoted by reaction of the sodium with a small amount of aromatic hydrocarbons (cymenes) which are present as by-products in the high temperature mode or with deliberately added aromatics. At any rate the addition of a little fresh sodium from time to time to compensate for losses due to impurities and mechanical losses keeps a catalyst bed in active condition.

When a hydrogenation catalyst is used, the usual types of hydrogenation catalyst poisons become important. If the carene is of sulfate turpentine origin, care should be taken to insure that the sulfur level is low. Hydrogenation catalysts are, however, not particularly sensitive to small amounts of air oxidation products in the carene, so a grade of carene which has received ordinary careful handling is adequate. In general copper chromite and related catalysts are usually less susceptible to trace amounts of catalyst poisons than nickel (Ni) or palladium (Pd) and may be especially attractive for this reason.

The d-trans-isolimonene obtained from the above process, being a p-menthadiene, can be converted to p-cymene by known methods for converting p-menthadienes to p-cymene. Also, it can be polymerized to hard terpene resins. If it is desired to utilize it for conversion to levo-menthol by the method of Pigulevsky and Kozhina, or other methods which require treatment of d-trans-2-menthene, it is desirable to selectively hydrogenate the exocyclic double bond. It can be seen that the possible hydrogenation products of d-trans-isolimonene

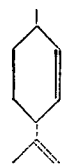
d-Trans-isolimonene are the following compounds

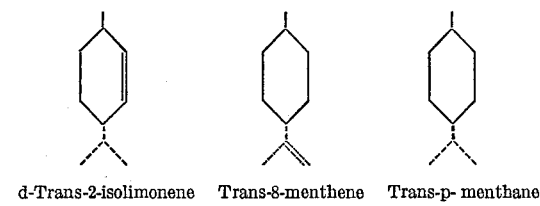

d-Trans-2-isolimonene    Trans-8-menthene    Trans-p-menthane

I have found that although nickel (Ni) and palladium (Pd) give all the hydrogenation products in a more or less random manner (cobalt, Co, behaves similarly), platinum (Pt) shows considerable selectivity in favor of d-trans-2-menthene and ruthenium (Ru) shows a technically satisfactory selectivity, giving a crude product containing approximately 80% d-trans-2-menthene, with the balance chiefly trans-p-menthane and no trans-8-menthene. The selectivity of platinum is improved by reducing the catalyst concentration almost to the vanishing point and by reuse of the catalyst. Under optimum conditions this catalyst can approach the performance of ruthenium, but otherwise it produces appreciable trans-8-menthene along with the favored 2-menthene and, of course, para-menthane. Since when d-trans-isolimonene is hydrogenated to d-trans-2-menthene under preferred conditions the crude analyzes about 80% by weight of d-trans-2-menthene, negligible amount of trans 8-menthene and the balance mostly trans-p-menthane with a little surviving d-trans-isolimonene, this mixture is suitable as is for conversion to levo-menthol by the process of Pigulevsky and Kozhina and by other means. Preferred hydrogenation conditions will use a minimum amount of catalyst, suitably 1% by weight or less, suitably Pt or Ru, a temperature of from about 0° C. to 100° C., and a pressure of from atmospheric to 100 p.s.i.g. Higher pressures can be used if desired. Other catalysts such as Ni, Pd or Co can be used if desired. The upper temperature limit is that at which the isolimonene disproportionates.

d-Trans-isolimonene can also be reduced to d-trans-2-menthene by strictly chemical methods. Addition of a hydrogen halide, such as hydrogen chloride or hydrogen bromide, proceeds selectively to the exocyclic double bond first, giving 8-halo-2-menthene in nearly quantitative yield. The halogen can be selectively removed by, for example, reduction with sodium and alcohol or other metal/active hydrogen combinations whereby there is produced d-trans-2-menthene.

Alternatively, d-trans-isolimonene can be converted to its aluminum derivative, as by heating with triisobutyl aluminum. The aluminum compound forms preferentially at the terminal double bond. Decomposition with water or other active hydrogen compound yields d-trans-2-menthene plus aluminum hydroxide. The reduction of the terminal unsaturation is quantitative.

d-Trans-isolimonene can also be converted to d-2,4(8)-p-menthadiene. The d-2,4(8)-p-menthadiene can subsequently, if desired, be converted to levo-menthol according to the teachings of Patent 2,851,481 and Patent 2,866,826.

To convert d-trans-isolimonene to d-2,4(8)-p-menthadience, the isolimonene is contacted with a strong base under conditions of temperature, time and base concentration to achieve isomerization. With the potassium tertiary butoxide/dimethyl sulfoxide system the isomerization proceeds almost instantaneously (and exothermically) at room temperature. It occurs as a side reaction when d-3-carene is heated with an active sodium catalyst at 170°–180° C. for the purpose of isomerizing it to d-4-carene. At this temperature d-4-carene slowly isomerizes thermally to d-trans-isolimonene, which the base catalyst converts to d-2,4(8)-p-menthadiene. Activated sodium catalyst of the Pines type (referred to hereinabove) causes the further conversion of d-2,4(8)-p-menthadiene to other products only slowly, but some other strong bases catalyze this further conversion quite rapidly.

The next isomerization is to the ring dienes, ultimately reaching an equilibrium which comprises about 50% α-terpinene, 20% gamma-terpinene, 25% 2,4(8)-p-menthadiene and 5% 3,8-p-menthadiene. The ring dienes dehydrogenate on to p-cymene as is known if this isomerization is carried out at high enough temperature. Thus with a particular strong base catalyst a suitable time and temperature should be chosen to effect the desired isomerization in a reasonable time and the reaction should be stopped to prevent further conversion of the desired d-2,4(8)-p-menthadiene to unwanted products. The same types of catalyst as used for the isomerization of d-3-carene to d-4-carene are suitable. The conversion can readily be followed by infrared spectrometry, gas chromatography or ultraviolet spectrometry. Suitable operating conditions vary from room temperature or below (potassium tertiary butoxide/dimethyl sulfoxide system) to reflux temperature with Pine's type activated sodium catalyst.

d-Trans-isolimonene can also be converted to d-2,4(8)-p-menthadiene by noncatalytic methods. Thus, for example, one mol of HCl is added to d-trans-isolimonene to give the monohydrochloride 8-chloro-2-menthene in substantially quantitative yield. Refluxing this with bases such as pyridine or alcoholic caustic potash converts it largely to d-2,4(8)-p-menthadiene.

The following examples are illustrative of this invention. In the examples, unless otherwise specified, parts and percentages are by weight.

Example 1

A reaction flask, fitted with high speed agitator, was fitted with a nitrogen pump, vent, thermometer, and infrared lamp for heating. To it was charged under nitrogen 500 grams dry xylene (mixed isomers) and 10 grams freshly cut sodium. The flask was heated to 100° C. with the infrared lamp to melt the sodium and the agitator then started. After a few minutes of vigorous agitation, the heat lamp was shut off and the mixture allowed to cool to 70° C. with agitation continuing to keep the sodium dispersed during solidification. The agitator was then stopped and the mixture allowed to cool and settle for 2½ hours. At that time 250 cc. of xylene was pipetted off the mixture taking very little of the sodium. To the remaining suspension in the flask was added 250 cc. of d-3-carene (95% purity by gas chromatographic analysis) which had been distilled over sodium and stored under nitrogen. The mixture was sampled for a starting reference infrared spectrogram, then stirred at 65° C. for one hour and sampled again. No formation of d-4-carene had occurred. To the mixtue at 65° C. was then added 10 cc. of o-chlorotoluene, which caused the temperature to rise rapidly to 82°. One hour after the addition of o-chlorotoluene, a sample examined by infrared showed that the formation of d-4-carene had commenced. The agitation was continued at 82° C. for an additional 3½ hours and the mixture again sampled. About 40% of the d-3-carene was converted to d-4-carene.

Example 2

To a 2 liter stirred flask was charged 600 grams xylene (mixed isomers) and 100 grams distilled off to insure dryness. The condenser was then moved to the reflux position and 10 grams of freshly cut sodium added, refluxing and stirring the mixture under a nitrogen blanket for a few minutes to disperse the sodium. To this refluxing and stirring mixture was added through a dropping funnel 10 cc. of ortho-chlorotoluene. The mixture was then allowed to reflux and stir overnight under nitrogen to preform an active catalyst.

The following morning, after cooling, 500 grams of d-3-carene (95% purity, distilled over sodium and stored under nitrogen) was added. The mixture was then reheated to reflux with stirring and sampled hourly for infrared analysis. A log of the operation was

| Time | Temperature, °C. | Remarks |
| --- | --- | --- |
| 0845 | 32 | Heat on. |
| 0930 | 151 | Refluxing. |
| 1030 | 153 | Sample 1 (8% d-4-carene). |
| 1130 | 153 | Sample 2 (24% d-4-carene). |
| 1230 | 153 | Sample 3 (38% d-4-carene). |
| 1330 | 152 | Sample 4 (42% d-4-carene). |
| 1430 | 152 | Sample 5 (42% d-4-carene). |

Infrared showed an hourly increase in d-4-carene until the fourth hour. Sample 5 showed no further increase in d-4-carene content.

Example 3

An isomerization of d-3-carene was carried out in which the active sodium catalyst was prepared in situ by refluxing and stirring a mixture of 3 liters of a 50:50 d-3-carene (95%)/xylene mixture previously distilled over sodium, 10 grams sodium metal and 10 cc. o-chlorotoluene. Refluxing and stirring was continued until infrared examination of a sample showed that equilibrium was approached. The mixture was then cooled and the catalyst settled. The carene/xylene mixture was decanted and replaced with ½ gallon of fresh carene only (no xylene) which had been distilled over sodium. The mixture was refluxed and stirred until infrared showed that the equilibration was approached. The carene was again decanted and replaced with fresh carene (distilled over sodium). This procedure was repeated until a total of six runs using full strength carene had been made over the same catalyst bed. Due to the multiplicity of runs, the procedure was simplified to merely allowing the mixture to stir and reflux overnight and then examining it the following morning to be sure that isomerization had taken place. Under these conditions the mixtures refluxes at 170° C. to 175° C. More by-products were formed. A gas chromatographic analysis of the sixth run using straight d-3-carene on the same catalyst bed showed:

| Component | Percent | Identity |
| --- | --- | --- |
| 1 | Trace | Not identified. |
| 2 | 0.3 | Do. |
| 3 | 1.1 | 2-carene. |
| 4 | 0.2 | Not identified. |
| 5 | 35.1 | d-4-carene. |
| 6 | 47.0 | d-3-carene. |
| 7 | 1.6 | Dipentene. |
| 8 | 0.3 | Not identified. |
| 9 | 7.3 | Meta- and para-cymenes. |
| 10 | 47.0 | d-2, 4(8)-p-menthadiene. |
| 11 | 0.5 | Not identified. |

It will be seen that the ratio of d-4-carene to d-3-carene is about 43:57.

At the end of this series the catalyst bed, after decanting off the last carene, was stored under nitrogen for 3 months. Resumption of use (same procedure) showed that the catalyst was still active but slow. Addition of 10 grams fresh sodium (but no o-chlorotoluene) revived the activity. Three additional runs were made normally and the catalyst bed again stored under nitrogen.

When the isomerization of d-3-carene was carried out at about 150° C. by refluxing and stirring in the presence of toluene or xylene to hold the boiling point to this temperature, the formation of by-products is almost completely suppressed. Other things being equal, of course, the isomerization of d-3-carene to d-4-carene is somewhat slower at 150° than at 170° C. The GC analysis of a reaction in toluene showed: (toluene free basis) 35.5% d-4-carene, 59.5% d-3-carene, 5% other (from 95% pure starting 3-carene).

Example 4

Most of the crude equilibrated carene prepared in Example 3 was filtered through a folded filter paper after decantation from the catalyst and charged to a 2-liter Parr stainless steel autoclave in 1500 cc. portions. Each charge was heated to 220° C. and held at 220° for 4 hours, then cooled. A pressure of about 40 p.s.i.g. developed at 220°. Infrared examination showed no surviving d-4-carene; the d-4-carene bands disappeared and d-trans-isolimonene bands appeared. Negligible change occurred in the d-3-carene content. The d-trans-isolimonene in substantially pure form was separated by fractional distillation and had the following physical properties:

| | |
| --- | --- |
| $N_D^{25}$ | 1.4636 |
| $d_{25}$ | .8230 |
| $\alpha_D^{25}$ (10 cm. tube, neat) degrees | +167 |
| Purity by GC percent | 99 |

Example 5

A portion of the equilibrated carene described in Example 3 was subjected to fractional distillation to separate d-4-carene from d-3-carene in a column 1" x 10' packed with 0.16 inch protruded packing operated at 25 torr, 30:1 reflux ratio. The separation of d-4-carene was less sharp than the separation of d-trans-isolimonene from d-3-carene but d-4-carene with the following properties was obtained.

| | |
| --- | --- |
| $N_D^{25}$ | 1.473 |
| $d_{25}$ | 0.856 |
| $\alpha_D^{25}$ (10 cm. tube, neat) | +76.3 |
| $[\alpha]_D$ | +89.1 |
| UV (methanol) | $\lambda_{max}=215$ |
| | $\alpha=42$ |
| Purity by GC percent | 94 |

Example 6 d-Trans-isolimonene prepared in Example 4 was hydrogenated with a ruthenium catalyst as follows: To a Parr shaker bottle was charged 16 grams d-trans-isolimonene, 74 grams isopropanol and 0.16 gram of commercial 5% ruthenium on carbon catalyst. Starting pressure was 50 p.s.i.g. No hydrogen adsorption occurred until a heat lamp was applied to warm the bottle. Hydrogen adsorption then occurred over a period of two hours, by the end of which the hydrogenation became very slow and the shaker was stopped. After filtering off the catalyst and washing out the isopropanol with water, the product was examined by infrared and gas chromatography. The gas chromatogram showed 7.4% trans-p-menthane, 75.4% d-trans-2-menthene, 11.5% unreacted d-trans-isolimonene and negligible trans-8-menthene.

Example 6A

In another experiment ruthenium catalyst was shaken in isopropanol at 50 p.s.i.g. using a heat lamp to preactivate it. The catalyst was then recovered by filtration and charged to the Parr shaker with 14 grams of isolimonene. The hydrogenation was discontinued after a fall of 8 p.s.i.g. in reservoir pressure (about the theoretical amount of hydrogen). GC analysis showed 15.2% trans-p-menthane, 78.0% d-trans-2-menthene, 5.4% d-trans-isolimonene, and a minor amount of other compounds. No 8-menthene was detected.

Example 7

The following were charged to a 5-liter stirred flask equipped with gas sparge tube, thermometer, vent nitrogen purge:

| | |
| --- | --- |
| d-Trans-isolimonene cc | 750 |
| Isopropanol cc | 3000 |
| Pt oxide catalyst gram | 0.5 |

Hydrogen was added through the sparge tube (temperature held at 30° C.±2°) and samples were removed periodically for examination by infrared. Each sample was drowned in water and the oil layer washed and dried. Index of refraction was also taken. When the infrared showed a marked diminution of the terminal methylene band, GC analyses were also run. Data are shown below. No. GC analyses were made of the first three samples.

| Component | Sample | | | Identity |
|---|---|---|---|---|
| | 4 | 5 | 6 | |
| 1 ............percent.. | 0.7 | 0.4 | 0.6 | Not identified. |
| 2 ..............do.... | 9.2 | 16.6 | 19.4 | Trans-p-menthane. |
| 3 ..............do.... | 1.1 | 0.6 | 1.4 | Not identified. |
| 4 ..............do.... | 62.2 | 67.6 | 68.7 | d-Trans-2-menthene. |
| 5 ..............do.... | 6.0 | 4.8 | 2.0 | Trans-8-menthene. |
| 6 ..............do.... | | 0.4 | 0.6 | Not identified. |
| 7 ..............do.... | 16.1 | 2.4 | 0.9 | d-Trans-isolimonene. |
| 8 ..............do.... | 1.1 | 1.3 | 1.5 | Not identified. |
| 9 ..............do.... | 0.4 | | | Do. |
| 10 .............do.... | 3.4 | 5.9 | 4.9 | Do. |
| $N_D^{25}$ | 1.4510 | 1.4479 | 1.4475 | |

Example 7A

The selectivity of a Pt catalyst was improved by operating as follows: To the Parr shaker bottle was charged 15 grams d-trans-isolimonene and 0.075 gram Pt oxide catalsyt. The hydrogenation, run at 50 p.s.i.g. initial hydrogen pressure, was stopped in 40 minutes when approximately the theoretical amount of hydrogen had been absorbed. The contents of the bottle were poured out and analysis showed inadequate selectivity. Without washing the bottle, 15 grams fresh d-trans-isolimonene was charged to it, but no catalyst. Traces of catalyst remained on the walls of the bottle. In one and one-half hours the d-trans-isolimonene had taken up approximately the theoretical amount of hydrogen and the shaker was stopped 20 minutes later. GC analysis of this showed 15.2% trans-p-methane, 78.0% d-trans-2-menthene, 5.4% d-trans-isolimonene, no 8-menthene, and the balance, minor impurities.

This procedure of operating with only a trace of Pt catalyst was scaled up as follows: To a 1-liter Parr stirred reactor equipped with cooling coils was charged 750 cc. (620 grams) of d-trans-isolimonene, prepared in Example 4, and 0.25 gram of Pt oxide catalyst. Initial pressure of hydrogen was 100 p.s.i.g. The hydrogenation was allowed to proceed at room temperature (held by use of the cooling coil) until approximately the theoretical amount of hydrogen had been taken up. GC analysis of the product showed 13.8% trans-p-menthane, 78.1% d-trans-2-menthene, 6.9% unreacted d-trans-isolimonene, no 8-menthene, and 1.3% impurities.

After filtering off the catalyst, the crude d-trans-2-menthene was used without further treatment for conversion, in good yield, to levo-menthol by the procedure of Pigulevsky and Kozhina.

Example 8

In each of these experiments 16 grams d-trans-isolimonene was diluted with 74 grams isopropanol and hydrogenated in a Parr shaker with the catalyst indicated at room temperature and until approximately the theoretical amount of hydrogen had been taken up as measured by fall in pressure of the reservoir. Initial pressure of hydrogen was 50 p.s.i.g. After removal of the catalyst by filtration and the isopropanol by washing with water, the hydrogenation product was examined by infrared. The catalysts used were Raney nickel, Raney cobalt and commercially available 5% Pd on carbon. The infrared spectrograms of these experiments showed less d-trans-2-menthene than was obtained with Pt or ruthenium catalysts and further showed the presence of 8-menthene. A GC analysis was run on the Raney cobalt experiment. This showed 19.1% trans-p-menthane, 58.4% d-trans-2-menthene, 16.4% trans-8-menthene, 2.4% d-trans-isolimonene. The distribution of products using Pd and Ni differed somewhat from that obtained with Raney cobalt.

Water-wet Raney nickel catalyst sometimes shows increased selectivity. However, shaking 16 grams isolimonene with water-wet Raney nickel catalyst at room temperature, initial pressure 50 p.s.i.g., reaction time 3 hours, gave a product which analyzed by GC 13.0% trans-p-menthane, 48.6% d-trans-2-menthene, 18.7% trans-8-menthene, and 16.8% d-trans-isolimonene.

Because trans18-menthene reacts with peracids at approximately the same rate as d-trans-2-menthene, it consumes peracids uselessly if present in admixture with the 2-menthene to be used in the levo-menthol process of Pigulevsky and Kozhina, and other processes. Its formation then is not only a waste or starting isolimonene but it causes additional waste in subsequent steps.

Example 9

A 25 cc. sample of pure d-3-carene was added to 110 cc. of dimethyl sulfoxide dried with molecular sieves and 9.0 grams of potassium tertiary butoxide. The mixture was stirred at 65° C. for 23 hours. The mixture was then drowned in water and the oil extracted with hexane. The hexane solution was washed, and the hexane subsequently distilled off. Gas chromatographic analyses showed two peaks: one of 40.7% and the other of 59.3%. The first peak corresponds to d-4-carene and the second peak to d-3-carene.

The reaction was scaled up using 253 cc. of 95% d-3-carene (impurities were other turpentine components but no 4-carene), 1112 grams dimethyl sulfoxide, and 91 grams potassium tertiary butoxide. The crude product, after washing, analyzed by gas chromatography contained 37% d-4-carene, 58.4% d-3-carene, and 4.5% other components. The crude product was fractionated in a laboratory still having a 1" x 48" column packed with 0.16" protruded packing. No sharp separation was obtained between the carenes (the column is too short for this), but enrichment of the lower boiling d-4-carene was obtained in the early fractions. A cut which contained 56% d-4-carene, balance mostly d-3-carene, was taken for isomerization studies. Ten capsules were made of glass tubing and a few drops of the above 56% d-4-carene cut sealed in each. Five of the capsules were immersed in a temperature controlled bath at 220° C. and the other five in a bath at 200° C. The vials were removed from the baths at timed intervals, cooled, opened and their contents analyzed by gas chromatography. The analyses showed a steady decrease in d-4-carene, formation of d-trans-isolimonene in a corresponding amount, and no significant change in the concentration of d-3-carene.

Seventy (70) cc. of the d-4-carene-enriched material described above was heated in a pressure bottle immersed in an oil bath at 220° C. for 4 hours. After cooling, infrared examination of a sample showed no surviving d-4-carene, but essentially a mixture of d-trans-isolimonene and d-3-carene. The isomerizate was fractionated in a ½" x 24" packed column at atmospheric pressure to produce a concentrate of d-trans-isolimonene. The best fractions still contain some d-3-carene but showed an optical rotation $\alpha_D$ of +140° in the 10 cm. tube, Neat. Fractionation of an isolimonene/3-carene mixture in a more efficient column separates the d-trans-isolimonene completel yfrom d-3-carene, as described in Example 4.

Seven and five-tenths cc. of impure d-trans-isolimonene from the ½" column distillation was fed in slowly to a slurry of 1 gram of aluminum chloride in 20 cc. of toluene at 10°–12° C. Stirring was continued for 30 minutes and then the catalyst washed out with dilute hydrochloric acid. Toluene was removed by heating under low vacuum. A hard terpene resin was obtained which was brittle and readily shattered when cool.

Example 10

An active catalyst was prepared by stirring 1 gram of sodium metal in 26 grams β-methyl naphthalene at 183°–205° C. for 2.25 hours. A dense black suspension of a solid in a black liquid was obtained. To this was added 25 cc. of pure d-3-carene. After an induction period of 0.5 hour at 110–140° C., a reaction period of 8 hours at 150° C. was allowed. After washing out the catalyst, GC analysis of the product (β-methyl naphthalene-free basis) showed 1.06% 2-carene, 44.1% d-4-carene, 54.1% d-3-carene and 0.75% of higher boilers comprised of meta- and para-cymene and d-2,4(8)-p-menthadiene.

When the reaction temperature was increased to the 170°–180° C. range, the reaction time was shortened but the amount of higher boiling compounds increased. With the β-methyl naphthalene/sodium system it is possible to distill out the isomerized carene mixture from the reaction mass and recharge fresh carene to the catalyst.

Example 11

An active catalyst was prepared by dispersing 0.975 gram of freshly cut potassium in 20 cc. refluxing ortho-vylene by means of a high speed mechanical stirrer. When the potassium was well dispersed, the mixture was cooled to 90° C. and 15 cc. of a 15% solution of n-butyl lithium in hexane was added. The mixture was held at 90° C. for 1¾ hours and then 20 cc. of pure d-3-carene was added. This mixture was held at 110°–125° C. for 19 hours. Gas chromatographic analysis of the product after removal of the catalyst was 42.6% d-4-carene, 52.4% d-3-carene, and 4.3% higher boiling by-products (solvent-free basis).

Example 12

An active catalyst was prepared by high speed stirring of 0.575 gram freshly cut sodium with 16 cc. of gamma-picoline for 50 minutes at 143° C. To this mixture was added 13.6 grams of pure d-3-carene and the whole stirred at 123°–143° C. for 22 hours. After removal of the catalyst and picoline, the product was analyzed by gas chromatography which showed 0.8% 2-carene, 39.9% d-4-carene, 56.7% d-3-carene and 2.6% higher boiling products.

Example 13

An active catalyst was prepared by stirring 0.694 gram lithium metal with 50 cc. ethylene diamine in a 500 cc. flask, under nitrogen, at 110°–116° C. A blue color developed and faded as the lithium reacted. When the blue color had faded out, the mixture was heated and stirred for 2 more hours at 100°–116° C.

The reaction flask was then immersed in a constant temperature bath controlled at 86° C.±0.5° and 158 cc. of d-3-carene added to the solution of lithium in ethylene diamine. Stirring and heating were continued for 2 hours longer (under nitrogen) and the mixture then allowed to cool to room temperature and stand overnight. Examination of a sample by gas chromatography showed that the carene was equilibrated by the procedure. It was found possible to use the same catalyst to equilibrate two additional 158 cc. portions of d-3-carene with a decrease in activity of the catalyst with each one.

Example 13A

An active catalyst was prepared as follows: 18 grams $Al_2O_3$ (Harshaw alumina Al 0102P) 100/300 mesh, was dried by heating in a stainless steel tube at 500° C. and 3–5 torr for 20 hours. A slow flow of nitrogen was maintained through the tube during this period.

The calcined alumina was cooled and transferred under nitrogen to a 100 cc. stirred flask containing 1.55 grams of sodium metal. The mixture was then heated to 150° C. and stirred for 2 hours to disperse the sodium on the alumina. The resulting black catalyst contained 8% of sodium. Seven and nine-tenths grams of this catalyst (cooled, under nitrogen) was slurried with hexane and transferred to a 100 cc. stirred flask containing 40 cc. of d-3-carene. The mixture was stirred and heated from room temperature to 90° C. A gas chromatographic analysis showed that the carene had approached the equilibrium composition in 48 minutes.

Example 14

To the stillpot of a 1″ x 48″ fractionating column packed with protruded packing was charged 200 cc. of toluene. Fifty cc. was distilled off to insure dryness and then 6 grams freshly cut sodium and 3 cc. o-chlorotoluene were added to the pot. This mixture was refluxed overnight to form an active catalyst. Next 250 cc. of d-3-carene (95% pure but containing no 4-carene) was added slowly down the column, maintaining reflux to avoid entry of air. Next the toluene was distilled off and the distillation of the carene commenced at a slow takeoff rate to allow for isomerization and rectification. Infrared examination of the overhead showed that it was essentially a mixture of d-3-carene and d-4-carene. After running overnight, infrared examination of the stillpot contents showed that it contained chiefly meta- and para-cymenes.

Example 15

To the bottle of a Parr shaker was charged ½ teaspoon of low activity Raney nickel catalyst slurry in water. The water was displaced from the nickel by swirling with isopropanol, settling and decanting a total of three times. All possible isopropanol was poured off and then 198 grams of technical grade d-3-carene (90–95%, containing no 4-carene) was charged to the bottle. Hydrogenation was run under an initial pressure of 50 p.s.i.g. hydrogen and room temperature. The reaction proceeded slowly and was stopped after running for nearly 3 days, during which period approximately 57% of the theoretical hydrogen for saturation of one double bond had been absorbed. During the course of the hydrogenation four samples were taken and examined by infrared. These samples showed that the concentration of d-4-carene rose to a maximum and then slowly decreased as the hydrogenation of both d-3-carene and d-4-carene to carane proceeded.

This partly hydrogenated mixture comprising essentially carane plus d-3-carene and d-4-carene was charged to a stlil having a 1″ x 48″ protruded packed column and fractionated at 30:1 reflux ratio and 25 torr. The column was not adequate to make sharp separations between these close-boiling components, but as the distillation proceeded, fractions became enriched successively in carene, 4-carene, and 3-carene, as determined by infrared examination of the fractions.

Example 16

To the bottle of a Parr shaker was charged 198 grams of technical grade (90–95%) d-3-carene which contained no 4-carene by infrared examination, and 4 grams of 5% Pd on carbon catalyst. The apparatus (including the reservoir) was charged with hydrogen to a pressure of 5 p.s.i.g. and the shaker run for 2 hours, at the end of which time the contents of the bottle were sampled and examined by infrared analysis. The pressure had dropped to zero p.s.i.g. over this period. Negligible d-4-carene was present. The apparatus was recharged to 5 p.s.i.g. and run 2 hours more. This time a sample showed that a small amount of d-4-carene was being formed. The pressure was then raised to 50 p.s.i.g. and the hydrogenation continued for 24 hours. A sample taken at this time showed much d-4-carene along with carane by infrared analysis. Finally, the reaction was warmed with a heat lamp for another 24 hours to complete the reduction. Approximately 20% over the theoretical hydrogen for one double bond was absorbed and the final infrared curve showed carane plus the presence of non-carane bands which were ultimately identified as belonging to 1,1,4-trimethylcycloheptane. Formation of this material from carene requires 2 mols of hydrogen; hence, the excess over theoretical absorbed.

Example 17

A 95% grade of d-3-carene (containing no 4-carene) was charged to a Parr stirred autoclave. Copper chromite catalyst in the amount of 1 or 2% based on carene was charged as noted. Pressures of 100 p.s.i.g. and 500 p.s.i.g. were used as noted. All runs were made at 165° C. Samples were filtered to remove catalyst and examined by infrared spectrometry and gas chromatography. Results were as follows:

| Run | Percent Catalyst | Pressure, p.s.i.g. | Time, hrs. | GC Analysis |
|---|---|---|---|---|
| 1 | 1 | 500 | 10 | 21.3% d-4-carene, 66.3% d-3-carene. |
| 2 | 2 | 100 | 13 | 29.6% d-4-carene, 54.3% d-3-carene. |
| 3 | 2 | 100 | 13 | 32.2% d-4-carene, 49.2% d-3-carene. |

Runs 1 and 2 were made using 400 grams d-3-carene, run 3 using 1200 grams. When the autoclave was valved off from the hydrogen supply regulator, a very slow fall in pressure showed that a slow hydrogenation accompanied the equilibration of the carenes. Gas chromotographic analysis showed that the non-carenes were almost entirely eluted ahead of the carenes; they are presumably saturated hydrocarbons but were not identified.

The material from Run 3, after removal of the catalyst, was autoclaved at 220° C. for 4 hours to convert the d-4-carene content to d-trans-isolimonene. No change occurred in the 3-carene content. Fractionation of the thermally treated product in a 1″ x 10′ protruded packed column then gave d-trans-isolimonene contaminated with more or less hydrogenated products, followed by d-3-carene suitable for recycle. Although this process produces lower purity d-trans-isolimonene than the base-catalyzed isomerization plus thermal treatment does, nevertheless because the contaminants are saturated hydrocarbons, they do not, in general, interfere with further uses of the d-trans-isolimonene so produced.

Example 18

To a 500 cc. stirred flask was charged 110 cc. dry dimethyl sulfoxide and 9 grams potassium t-butoxide. To this mixture was added 25 cc. of d-trans-isolimonene at 25° C. The temperature rose rapidly to 34° C. and then slowly fell back, so that it had decreased to 32° C. at 15 minutes after the d-trans-isolimonene had been added. The mixture was sampled at this time and again 1 hour, 2 hours, and 3 hours after the d-trans-isolimonene had been added. After washing, the first two samples were examined by gas chromatography and all four samples by infrared. The GC analyses of the first two samples were as follows:

| Component | 15 Min. Sample, Percent | 1 Hr. Sample, Percent | Identity |
|---|---|---|---|
| 1 | 2.1 | 2.1 | Not identified. |
| 2 | 7.1 | 12.7 | α-Terpinene. |
| 3 | 0.1 | 0.3 | Not identified. |
| 4 | 2.0 | 3.8 | Do. |
| 5 | 8.8 | 8.2 | 3,8-p-menthadiene. |
| 6 | | 2.2 | Not identified. |
| 7 | 78.5 | 69.2 | d-2,4(8)-p-menthadiene. |
| 8 | 0.3 | 0.4 | Not identified. |
| 9 | 0.4 | 0.3 | Do. |
| 10 | 0.7 | 0.7 | Do. |
| 11 | 0.2 | 0.2 | Do. |

The last two samples showed successive increases in α-terpinene and decreases in d-2,4(8)-p-menthadiene as the system moved toward the p-menthadiene equilibrium.

The same experiment was repeated at 65° C. and sampled in 1 hour. The infrared spectrogram was that of a fully equilibrated p-menthadiene mixture.

Example 19

To a 500 cc. stirred flask were charged 10 grams sodium metal and 100 grams toluene. The mixture was heated to reflux with stirring and there was fed in through a dropping funnel a mixture of 43 grams d-trans-isolimonene hydrochloride (8-chloro-2-menthene) prepared by the addition of one mol of HCl to 1 mol d-trans-isolimonene, and 25 grams tertiary butanol. Feeding was carried out over 30 minutes. The mixture became quite thick 5 minutes later and it was necessary to add 100 cc. additional toluene through the reflux condenser. Refluxing and stirring were continued for 5½ hours longer, at which time water was cautiously added dropwise to the refluxing mixture to destroy the remaining sodium and decompose the alcoholate. After washing, the toluene was mostly distilled off with a column and the crude product analyzed by infrared and gas chromatography. GC analysis (toluene free basis) showed 86% d-trans-2-menthene, the balance being mixed menthadienes from base elimination of HCl from the d-trans-isolimonene hydrochloride. As these impurities are higher boiling than d-trans-2-menthene, they are readily separable by fractional distillation.

Example 20

To a nitrogen purged 500 cc. stirred flask was charged 68 grams d-trans-isolimonene and 50 grams triisobutyl aluminum. The mixture was heated to 120° C. and sufficient heptane was fed in from a dropping funnel so that the mixture refluxed gently at 120° C. Heating and stirring were continued overnight, during which time evolved isobutylene gas was collected in a cold trap and amounted to 28 grams. After cooling to room temperature, excess water was carefully added dropwise, holding the temperature below 50° C. with a cooling bath during most of the addition, but letting it rise to 70° C. at the end. Addition of water was discontinued when no further exotherm was observed. Six grams of isobutane were collected in the cold trap during the water addition (this originated from decomposition by water of the excess isobutyl aluminum originally charged). Infrared examination of the heptane solution showed d-trans-2-menthene, no remaining d-trans-isolimonene, no other menthenes, showing that no isomerization of the ring double bond occurred.

Example 21

In a 500 cc. stirred flask, 80 grams of pyridine were heated to reflux. Then 43 grams of d-trans-isolimonene hydrochloride (8 - chloro - 2 - menthene) prepared by addition of 1 mol of HCl to 1 mol d-trans-isolimonene was fed in slowly. Refluxing and stirring were continued for 4 hours, with samples withdrawn at 1, 2 and 4 hours. Pot temperature during treatment was 122° C. Infrared examination of the samples, after washing out the pyridine and pyridine hydrochloride with dilute hydrochloric acid, showed that the product was chiefly d-2,4(8)-p-menthadiene, with a small amount of regenerated d-trans-isolimonene. Optical rotation in a 10 cm. tube was +77°. The reaction was complete at the first hour.

A similar treatment using methanolic KOH solution prepared from 200 grams ethanol and 20 grams KOH pellets also produced d-2,4(8)-p-methadiene as the chief product. Because of the low refluxing temperature (67° C.), the reaction required two hours to come close to completion. The presence of very weak methoxyl bands in the infrared spectrum showed that ether formation was a minor side reaction.

Example 22

Example 13A was repeated except that the catalyst was prepared by using potassium in place of sodium. Results were equally satisfactory.

In accordance with this invention there are provided methods of converting d-3-carene to d-4-carene in good yield. While the description and examples have been directed primarily to the use of d-3-carene, 1-2-carene can be converted also to 1-4-carene by the process of this invention. Mixtures of d- and 1-3-carene can be converted to mixtures of d- and 1-4-carene also.

The hydrogenation catalysts employed to convert 3-carene to 4-carene are the noble metals such as platinum and palladium, the base metals such as nickel and cobalt, and metal oxides such as copper chromite. This conversion is accomplished in the presence of hydrogen at a pressure above atmospheric. The pressure at which the hydrogen will be supplied will vary depending primarily on the catalyst used. It is within the skill of those versed in the art, having before them the teachings and working examples of this specification, to adopt a pressure of hydrogen sufficient to convert 3-carene to 4-carene in satisfactory yields.

At present, there is little known utility for 4-carene. It can be used as a solvent for paints and as a cleaner for paint brushes. In accordance with this invention the 4-carene is preferably used for the manufacture of isolimonene. The d-1-carene obtained by isomerization of d-3-carene is converted to d-trans-isolimonene by heating at elevated emperature for a time sufficient to convert substantially all d-4-carene to d-trans-iliminene. It will be preferred to employ relatively high temperatures for this heat treatment and conversion of d-4-carene to d-trans-isolimonene thereby minimizing the time required for conversion. In addition to the time-temperature relationships set forth hereinabove, the time required for substantially complete conversion at 280° C. is about 2 minutes; at 300° C., about 30 seconds; at 350° C., about 0.7 second; at 400° C., about 0.016 second; and at 450° C., about 0.0004 second.

The d-trans-isolimonene prepared in accordance with this invention can be polymerized to hard solid polymers or resins that have utility as components for adhesive compositions, protective coating compositions, and the like.

Preferred use of d-trans-isolimonene in accordance with this invention is in the production of levo-methanol. In this regard, and as above set forth, the d-trans-isolimonene is first converted to either d-trans-2-menthene or d-2,4(8)-p-menthadiene. Either compound can then be converted to levo-menthol by methods known in the art.

It will be apparent from the description and the examples that d-3-carene can be isomerized to provide d-4-carene in good yield by contacting d-3-carene with relatively strong base compositions. Thus, this catalyst system is comprised of a base composition having basicity adequate to form carbanions of d-3-carene when contacted therewith. Using d-3-carene as a starting material, the isomerization is carried out preferably at temperatures of from about 23° C. (room temperature) to about 180° C. Not all the d-3-carene is converted to d-4-carene but there is provided an equilibrium mixture comprised of d-3-carene and d-4-carene, the d-3-carene predominating. Reaction can be stopped any time desired after d-4-carene has started to form. A reaction mixture containing d-3-carene and d-4-carene in a ratio of 80:20, respectively, is economically feasible. It will usually be desirable to carry out reaction until no appreciable additional d-4-carene is being produced, that is, an equilibrium mixture of d-3-carene and d-4-carene has been produced. Usually, the reaction will be carried out so as to provide a carene mixture containing d-3-carene to d-4-carene in a ratio of from about 60:40 to 57:43.

As shown above, d-3-carene is converted to d-4-carene in good yield using a catalyst system comprised of an alkali metal base composition having basicity adequate to form carbanions of d-3-carene when contacted therewith.

Base compositions useful in this invention include those initially comprised of an alkali metal and organic compounds capable of forming an organometallic compound with the alkali metal. Mononuclear aromatic hydrocarbons, such as toluene and xylene, and polynuclear aromatic hydrocarbons, such as naphthalene, methyl naphthalene, anthracene, fluorene, phenanthrene, and tetralin, are suitable organic compounds. When a mononuclear aromatic hydrocarbon is used, it is preferred to use a promoter such as o-chlorotoluene to initiate formation of the alkali metal derivative of the mononuclear aromatic hydrocarbon. As above set forth, heterocyclic compounds can be employed also. The heterocyclic compounds will usually contain rings consisting of a nitrogen atom and at least 4 and not more than 5 carbon atoms. The promoter, o-chlorotoluene, referred to above, can be used with an alkali metal, such as sodium, and an organic compound; or it can be used alone with the alkali metal to catalyze the isomerization reaction. Other halogenated aromatic compounds that can be used similarly to o-chlorotoluene include o-bromotoluene, o-chloroethyl benzene, and o-bromoethyl benzene. Alkali metal alkyls, such as amyl sodium, amyl lithium, and butyl lithium, are suitable base compositions for use as catalyst. These catalysts are used in an inert medium such as cyclohexane, heptane, hexane, nonane, and the like.

The following additional example is further illustrative of this invention.

Example 23

To a mixture of 8.5 cc. of 0.8 N amyl sodium in heptane and 200 cc. of n-nonane was added 20 cc. pure d-3-carene. Reaction was carried out for 52 minutes at 100° C. Analysis of the reaction mass showed (solvent-free basis) 0.82% d-2-carene, 43.7% d-4-carene, and 55.5% d-3-carene.

It is to understood that the above description of this invention is illustrative only and not in limitation thereof.

What I claim and desire to protect by Letters Patent is:

1. A process for converting 3-carene to 4-carene which comprises contacting 3-carene with a catalyst system comprised of an alkali metal base composition having basicity adequate to form carbanions of 3-carene when contacted therewith.

2. A process for converting d-3-carene to d-4-carene which comprises contacting d-3-carene with a catalyst system selected from the group consisting of
   (A) a base composition initially comprised of an alkali metal and a polynuclear aromatic hydrocarbon,
   (B) a base composition initially comprised of an alkali metal and a halogenated aromatic hydrocarbon,
   (C) a base composition initially comprised of an alkali metal and a heterocyclic compound having a ring consisting of a nitrogen compound and at least 4 and no more than 5 carbon atoms,
   (D) a base composition initially comprised of an alkali metal derivative of an alcohol and a dipolar aprotic solvent,
   (E) a base composition initially comprised of an alkali metal and an amine,
   (F) a base composition comprised of an alkali metal supported on alumina,
   (G) a base composition initially comprised of an alkali metal derivative of a nonaromatic hydrocarbon, and
   (H) a base composition initially comprised of an alkali metal and a mononuclear aromatic hydrocarbon.

3. The process of claim 2 wherein the catalyst system is (A) and is initially comprised of sodium and methyl naphthalene.

4. The process of claim 2 wherein the catalyst system is (B) and is initially comprised of sodium and o-chlorotoluene.

5. The process of claim 2 wherein the catalyst system is (C) and is initially comprised of sodium and gamma-picolene.

6. The process of claim 2 wherein the catalyst system is (D) and is initially comprised of potassium tertiary butoxide and dimethyl sulfoxide.

7. The process of claim 2 wherein the catalyst system is (E) and is initially comprised of lithium and ethylene diamine.

8. The process of claim 2 wherein the catalyst system is (F) and is initially comprised of sodium supported on alumina.

9. The process of claim 2 wherein the catalyst system is (F) and is initially comprised of potassium supported on alumina.

10. The process of claim 2 wherein the catalyst system is (G) and is initially comprised of butyl lithium.

11. The process of claim 2 wherein the catalyst system is (G) and is initially comprised of amyl sodium.

12. The process of claim 2 wherein the catalyst system is (H) and is initially comprised of an alkali metal and toluene.

13. The process of claim 2 wherein the catalyst system is (H) and is initially comprised of an alkali metal and xylene.

14. The process of claim 2 wherein the d-4-carene produced is subsequently heated at elevated temperatures for a period of time sufficient to convert substantially all thereof to d-trans-isolimonene.

15. The process of claim 4 wherein the d-4-carene produced is subsequently heated at elevated temperatures for a period of time sufficient to convert substantially all thereof to d-trans-isolimonene.

16. The process of claim 6 wherein the d-4-carene produced is subsequently heated at elevated temperatures for a period of time sufficient to convert substantially all thereof to d-trans-isolimonene.

17. The process of claim 7 wherein the d-4-carene produced is subsequently heated at elevated temperatures for a period of time sufficient to convert substantially all thereof to d-trans-isolimonene.

18. The process of claim 8 wherein the d-4-carene produced is subsequently heated at elevated temperatures for a period of time sufficient to convert substantially all thereof to d-trans-isolimonene.

19. The process of claim 9 wherein the d-4-carene produced is subsequently heated at elevated temperatures for a period of time sufficient to convert substantially all thereof to d-trans-isolimonene.

20. A process for producing d-trans-isolimonene which comprises heating d-4-carene at a temperature of at least about 180° C. for a period of time sufficient to convert substantially all d-4-carene to d-trans-isolimonene.

21. The process of claim 14 wherein the d-trans-isolimonene is subsequently converted to d-trans-2-menthene in good yield by contacting it, in the presence of hydrogen, with a hydrogenation catalyst.

22. The process of claim 15 wherein the d-trans-isolimonene is subsequently converted to d-trans-2-menthene in good yield by contacting it, in the presence of hydrogen, with a hydrogenation catalyst.

23. The process of claim 16 wherein the d-trans-isolimonene is subsequently converted to d-trans-2-menthene in good yield by contacting it, in the presence of hydrogen, with a hydrogenation catalyst.

24. The process of claim 17 wherein the d-trans-isolimonene is subsequently converted to d-trans-2-menthene in good yield by contacting it, in the presence of hydrogen, with a hydrogenation catalyst.

25. The process of claim 18 wherein the d-trans-isolimonene is subsequently converted to d-trans-2-menthene in good yield by contacting it, in the presence of hydrogen, with a hydrogenation catalyst.

26. The process of claim 19 wherein the d-trans-isolimonene is subsequently converted to d-trans-2-menthene in good yield by contacting it, in the presence of hydrogen, with a hydrogenation catalyst.

27. A method for producing d-trans-2-menthene which comprises contacting d-trans-isolimonene, in the presence of hydrogen, with a hydrogenation catalyst.

28. The process of claim 14 wherein the d-trans-isolimonene is subsequently converted to d-2,4(8)-p-menthadiene by contacting it with a catalyst comprised of potassium t-butoxide and dimethyl sulfoxide in admixture.

29. The process of claim 15 wherein the d-trans-isolimonene is subsequently converted to d-2,4(8)-p-menthadiene by contacting it with a catalyst comprised of potassium t-butoxide and dimethyl sulfoxide in admixture.

30. The process of claim 16 wherein the d-trans-isolimonene is subsequently converted to d-2,4(8)-p-menthadiene by contacting it with a catalyst comprised of potassium t-butoxide and dimethyl sulfoxide in admixture.

31. The process of claim 17 wherein the d-trans-isolimonene is subsequently converted to d-2,4(8)-p-menthadiene by contacting it with a catalyst comprised of potassium t-butoxide and dimethyl sulfoxide in admixture.

32. The process of claim 18 wherein the d-trans-isolimonene is subsequently converted to d-2,4(8)-p-menthadiene by contacting it with a catalyst comprised of potassium t-butoxide and dimethyl sulfoxide in admixture.

33. The process of claim 19 wherein the d-trans-isolimonene is subsequently converted to d-2,4(8)-p-menthadiene by contacting it with a catalyts comprised of potassium t-butoxide and dimethyl sulfoxide in admixture.

34. A method of producing d-2,4(8)-p-menthadiene which comprises contacting d-trans-isolimonene with a catalyst comprised of potassium t-butoxide and dimethyl sulfoxide in admixture.

35. The process of claim 14 wherein the d-trans-isolimonene is subsequently converted to d-2,4(8)-p-menthadiene by contacting the d-trans-isolimonene with a catalyst comprised of an alkali metal base composition having basicity adequate to form carbanions of d-trans-isolimonene when contacted therewith.

36. A method of producing d-2,4(8)-p-menthadiene which comprises contacting d-trans-isolimonene with a catalyst comprised of an alkali metal base composition having basicity adequate to form carbanions of d-trans-isolimonene when contacted therewith.

References Cited

UNITED STATES PATENTS

| | | | |
|---|---|---|---|
| 2,804,489 | 8/1957 | Pines et al. | 260—683.2 |
| 2,866,826 | 12/1958 | McLaughlin et al. | 260—631 |
| 2,851,481 | 9/1958 | Webb | 260—489 |
| 3,264,362 | 8/1966 | Webb | 260—675.5 |
| 3,185,744 | 5/1965 | Broaddus | 260—683.2 |
| 3,240,838 | 3/1966 | White et al. | 260—683.2 |
| 3,213,155 | 10/1965 | Schriesheim et al. | 260—683.2 |
| 3,217,050 | 11/1965 | Schriesheim et al. | 260—668 |
| 3,270,084 | 8/1966 | Schriesheim et al. | 260—683.2 |
| 3,278,623 | 10/1966 | Derfer | 260—675.5 |
| 3,325,553 | 6/1967 | Derfer | 260—675.5 |

OTHER REFERENCES

James Verghese, "3-Carene: Versatile Terpene" (a review), Perfumery Essential Oil Record 56 (7), 438–50 (July 1965), CA 63 (7), 8115d (Sept. 27, 1965).

James Verghese, "Studies in Terpenes II. 2-carene: Production by Isomerization of 3-carene," J. Indian Chem. Soc. 36, 151–4 (1959).

Ohloff, "Thermal Rearrangement of 4-carene," Tetrahedron Letters 1965 (42), 3795–800 (August 1965); CA 64, 3606b.

Ohloff et al., "Rearrangement of 3-carene to 4-carene," Helv. Chim. Acta 48 (7), 1665–8 (Oct. 30, 1965); CA 64, 760a.

Klaus, Gollnick et al., "Carane Series II. 4-carene und 2,8-p-Menthadien," Tetrahedron 22 (1), 123–132 (January 1966); CA 64, 14221h.

Semmler und von Schiller, "Contribution to Understanding of Essential Oils," Berichte Deutsche Chem. 60, 1591–1607 (1927).

Reggel et al., "The Li-Ethylenediamine System II. Isomerization of Olefins," J. Org. Chem. 23, 1136–9 (1958).

Cocker et al., "A Novel Reaction of Carene," Chem. Communications 1965 (12), 254–5 (June 1965).

Cocker et al., "Hydrogenation of the Pinenes and the Carenes," J. Chem. Soc. 1966 (IC), 41–47 (January 1966).

Piatkowski et al., "Configuration of 4-carene," Roczniki Chem. 40 (2), 213–20 (February 1966); CA 65, 2302d.

Simonsen book, "Terpenes II," pp. 61, 75, Cambridge Univ. Press (1949).

DELBERT E. GANTZ, *Primary Examiner.*

G. E. SCHMITKONS, *Assistant Examiner.*

UNITED STATES PATENT OFFICE
CERTIFICATE OF CORRECTION

Patent No. 3,407,241                                             October 22, 196

Albert B. Booth

It is certified that error appears in the above identified patent and that said Letters Patent are hereby corrected as shown below:

Column 3, after line 8, insert as a new paragraph -- Isolimonene can be represented by the formula --. Column 6, li 37, "6 hours" should read -- 16 hours --. Column 7, line 6, "di-2,4(8)" should read -- d-2,4(8) --; line 29, "so carene" should read -- so carane --. Column 9, line 8, "d-Trans-2-isolimonene" should read -- d-trans-2-menthene --; lines 62 and 63, "menthadience" should read -- menthadiene --. Column 11, second table, second column, line 10 thereof, "47.0" should rea -- 6.6 --. Column 14, line 1, "trans18-menthene" should read -- trans-8-menthene --. Column 18, line 49, "methadiene" should read -- menthadiene --; line 63, "1-2-carene" should read -- 1-3-carene --. Column 19, line 8, "d-1-carene" should read -- d-4-carene --; line 11, "isoliminene" should read -- isolimonen --; line 26, "methanol" should read -- menthol --.

Signed and sealed this 3rd day of March 1970.

(SEAL)
Attest:

EDWARD M. FLETCHER, JR.
Attesting Officer

WILLIAM E. SCHUYLER, JR.
Commissioner of Patents